United States Patent [19]

Credle, Jr.

[11] 4,441,684

[45] Apr. 10, 1984

[54] PUMP MOUNTING BRACKET

[75] Inventor: William S. Credle, Jr., Stone Mountain, Ga.

[73] Assignee: The Coca-Cola Company, Atlanta, Ga.

[21] Appl. No.: 324,682

[22] Filed: Nov. 25, 1981

[51] Int. Cl.³ .............................................. F16M 1/00
[52] U.S. Cl. ..................................... 248/674; 211/26; 248/207; 248/300
[58] Field of Search ............... 248/674, 675, 201, 207, 248/DIG. 5, 300, 311.2, 313, 221.3, 316.9, 316.91; 211/208, 44, 26

[56] References Cited

U.S. PATENT DOCUMENTS

| | | | |
|---|---|---|---|
| 1,115,253 | 10/1914 | Smith | 248/207 X |
| 1,137,773 | 5/1915 | Marsden | 248/201 X |
| 1,258,827 | 3/1918 | Todd | 248/201 X |
| 1,546,576 | 7/1925 | Erwin et al. | 248/313 X |
| 1,570,052 | 1/1926 | Erwin | 248/313 X |
| 1,778,992 | 10/1930 | Wulfert | 248/635 |
| 2,460,903 | 2/1949 | Peck | 248/201 |
| 2,589,641 | 3/1952 | Stewart | 211/44 X |
| 2,762,597 | 9/1956 | Jaworski | 248/313 X |
| 2,873,082 | 2/1959 | Gillespie | 248/300 |
| 2,920,340 | 1/1960 | Hopkins | 248/201 |

Primary Examiner—J. Franklin Foss
Assistant Examiner—David L. Talbott
Attorney, Agent, or Firm—Birch, Stewart, Kolasch & Birch

[57] ABSTRACT

There is disclosed a mounting bracket for one or several pumps having a support member with lateral, perpendicular projections having front edges with grooves formed therein for receiving corresponding engaging elements provided on the surface of the end closures of a pump. A center most groove is provided for each axial engaging element of the respective pump to firmly seat the pump housing in place in the bracket. Clip elements are provided superimposed over the respective center grooves to help guide the pump into position and retain the pump in the bracket thereafter.

30 Claims, 6 Drawing Figures

PUMP MOUNTING BRACKET

BACKGROUND OF THE INVENTION

The present invention relates to a unique mounting bracket and more specifically to a pump mounting bracket for a liquid dispensing pump which facilitates the connections of the respective feed lines of the pump with an associated dispensing system.

SUMMARY OF THE INVENTION

Various pump designs are available for utilization with beverage dispensing systems and for transferring liquids, and these prior pumps have met with varying degrees of success dependent upon the intended application thereof. For instance, various conventional pumps are normally adapted to handle relatively large volumes of liquid in a rather effective manner, but due to the nature in which they must be installed and operated they are restricted as to use. Their adaptability to changing environments is substantially limited with their specific mode of operation dictating the manner in which they may be implemented.

Therefore, it is an object of the present invention to provide a pump mounting bracket which will overcome the above and other disadvantages.

It is a further object of the present invention to provide a pump mounting bracket which allows pumps to be easily installed and removed at remote locations.

Another object of the present invention is to provide a pump mounting bracket which permits the pump to be mounted onto or removed from the bracket without the use of tools.

Yet, still another object of the present invention is to provide a pump mounting bracket which allows a pump to be mounted from the top, bottom or side while at the same time maintaining the pump outlet always on the top of the pump.

Yet, still a further object of the present invention is to provide a pump mounting bracket capable of holding a number of pumps at one time on a single bracket.

Yet, another object of the present invention is to provide a mounting bracket which is not limited by the type of surface upon which the bracket may be mounted and which does not experience an increase in stress upon normal flexing of a pump attached thereto.

The foregoing objects and others are accomplished in accordance with the present invention, generally speaking, by providing a mounting bracket having a base or attachment surface, each end thereof terminating in a lateral flange member extending perpendicular from the mounting base, parallel one to the other. Each of said parallel flanges has a clip means riveted, preferably to the outer surface, midway between the upper and lower edges of the respective flanges. The front edge of each of said flanges is interrupted by several U-shaped grooves extending parallel to the upper and lower edges toward the mounting base for engaging corresponding elements on the ends of a pump to be mounted thereon, more fully discussed below. The center most groove of each flange located midway between the upper and lower edges is cut such that the depth of the groove is equal to the radius of the end of the pump to be mounted thereon. The grooves positioned at the lateral most extremity of the front edge of each flange have a depth equal to the corresponding diameter of the engaging elements on the ends of the pump to be mounted on the bracket. Each clip means has a groove cut in its respective surface extending from a rear portion at which it is riveted to the corresponding flange to terminate at a bent, wing-like front portion where the groove ends at the point at which the clip is bent, the groove in the clip corresponding to or superimposed over the central groove of the flange. The front or wing portion of the clip extends beyond the front edge of the flange and is bent outwardly from the lateral flange so as to provide a surface which engages or contacts corresponding elements on the extremity of the pump and which guides or snaps the elements into the elongated groove of the flange and holds the pump in position. The upper and lower grooves of the flange readily receive circular pins mounted on the periphery about the ends of the pump and, together with the central groove, which engages a pin positioned in the center of the end of the respective side of the pump and a pin element on the periphery of the end of the pump, steadfastly hold the pump in a fixed position. Due to the nature of the fabrication of the ends of the pump which are provided with the engaging pins for the bracket, the beforementioned pump mounting bracket may be fixed by its base to any suitable surface such that the pump may be snapped into the bracket from any position while at all times retaining the pump outlet at the top of the pump. The pump will snap into and out of the bracket without the use of tools. The bracket will not transfer stress to the pump even if the bracket is mounted on a relatively uneven surface. Furthermore, normal flexing of the pump will not transfer stress to the mounting bracket. Due to the simple but unique construction of the bracket, pumps may be easily installed and removed at remote, field locations. Allowing the pump to be mounted to the bracket in such a way that the outlet thereof always remains on the top of the pump ensures proper function of the pump and further facilitates connecting of the respective feed and gaslines to the pump.

BRIEF DESCRIPTION OF THE DRAWINGS

The invention is further illustrated by way of the accompanying drawings wherein.

DETAILED DESCRIPTION OF THE DRAWINGS

In the respective views, like elements will be represented by the same identifying numbers.

Figure 1:
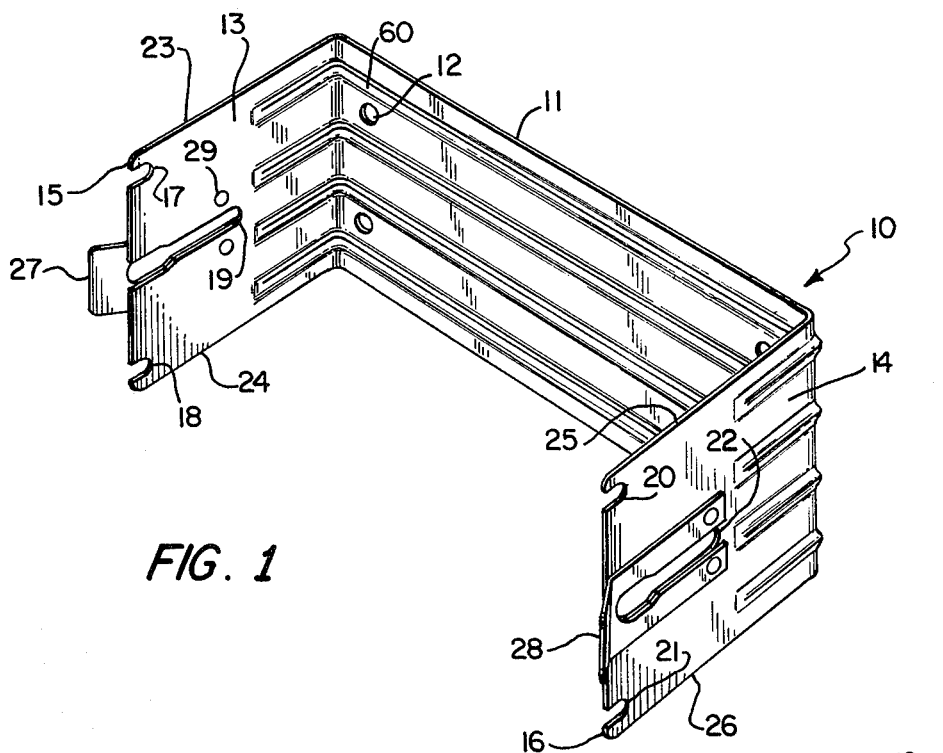
FIG. 1 represents a perspective view of the bracket of the present invention.

Referring now to FIG. 1, there is seen in perspective view the mounting bracket of the present invention generally designated 10 having a base portion 11 which is mounted by any suitable means to a surface by way of openings 12. Flange members 13 and 14 project from the end portions of the mounting base at right angles thereto parallel to each other so as to terminate at front edges 15 and 16 respectively. For purposes of the present discussion each of the front edges has formed therein three engaging U-shaped grooves identified as 17, 18 and 19 for flange 13 and 20, 21 and 22 for flange 14. The configuration of the upper and lower grooves is determined by the size and shape of the respective engaging elements on the ends of the mounted pump further discussed below. Grooves 19 and 22 located midway between the upper and lower edges 23, 24, 25 and 26 of the respective flanges likewise have a configuration determined by the size and shape of the engaging elements and also the ends of the pump. In the present illustrations the engaging elements are represented as being circular in shape and the ends of the pump circular also. Thus, with respect to the upper and lower grooves, the depth will be determined by the diameter of the respective engaging elements and the midway grooves will have a depth substantially corresponding to the radius of the mounted pump for receiving axial and peripheral projections of the pump which are snapped into place and held firmly by clips 27 and 28. In any respect, the depth of the center or midway grooves will be at least no greater than the width of the respective lateral flanges as measured from the base 11 to the front edges 15 and 16 thereof. This operation will be further discussed below with respect to FIG. 5.

Figure 2:
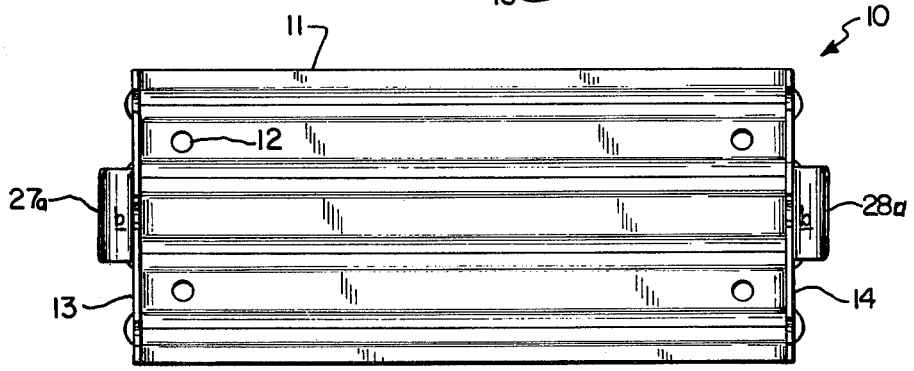
FIG. 2 represents a front elevational view of the bracket of the present invention.
Figure 3:
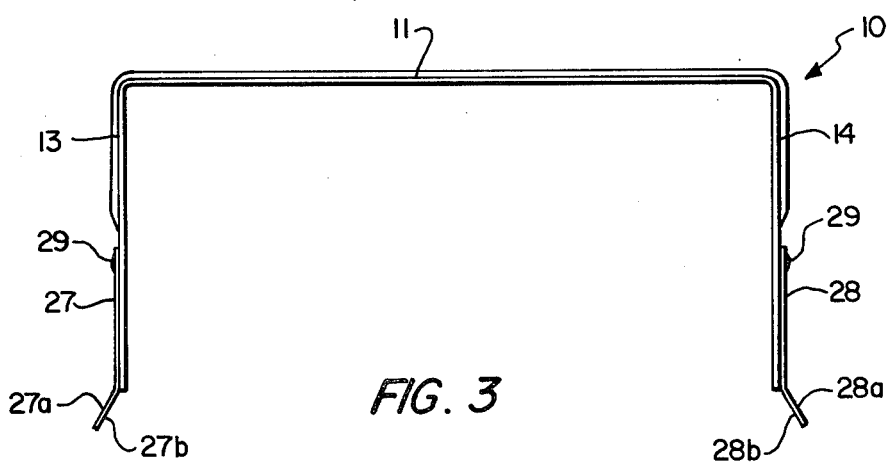
FIG. 3 represents a top view of the bracket of the present invention.

Referring now to FIGS. 2 and 3 there is seen from the front and top, views of the mounting bracket of the present invention representing the relationship of the clip members 27 and 28 riveted at 29 to their respective flange members 13 and 14. The clip like members 27 and 28 can be seen to terminate at the end opposite to which they are riveted to the flanges by winglike protrusions 27a and 28a having surfaces 27b and 28b which engage protrusions from ends of the pump to be mounted and guide them into the grooves 19 and 22 respectively.

Figure 4:
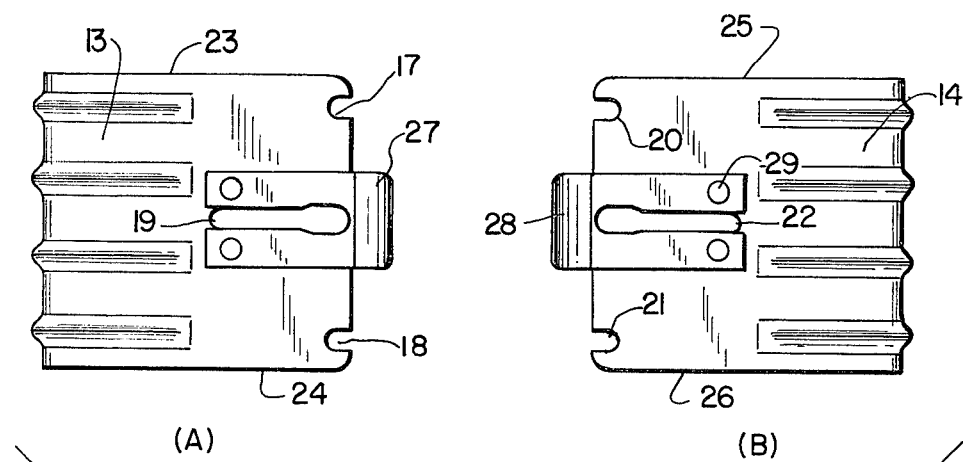
FIG. 4 represents side elevational views of the bracket of the present invention.

FIG. 4 represents both left (A) and right (B) elevational views of the mounting bracket of the present invention illustrating the depth of the front edge grooves of the lateral flanges 13 and 14 respectively. The relationship of the clips 27 and 28 with respect to the grooves 19 and 22, riveted at 29 to the flange members 13 and 14, is also clearly shown.

Figure 5:
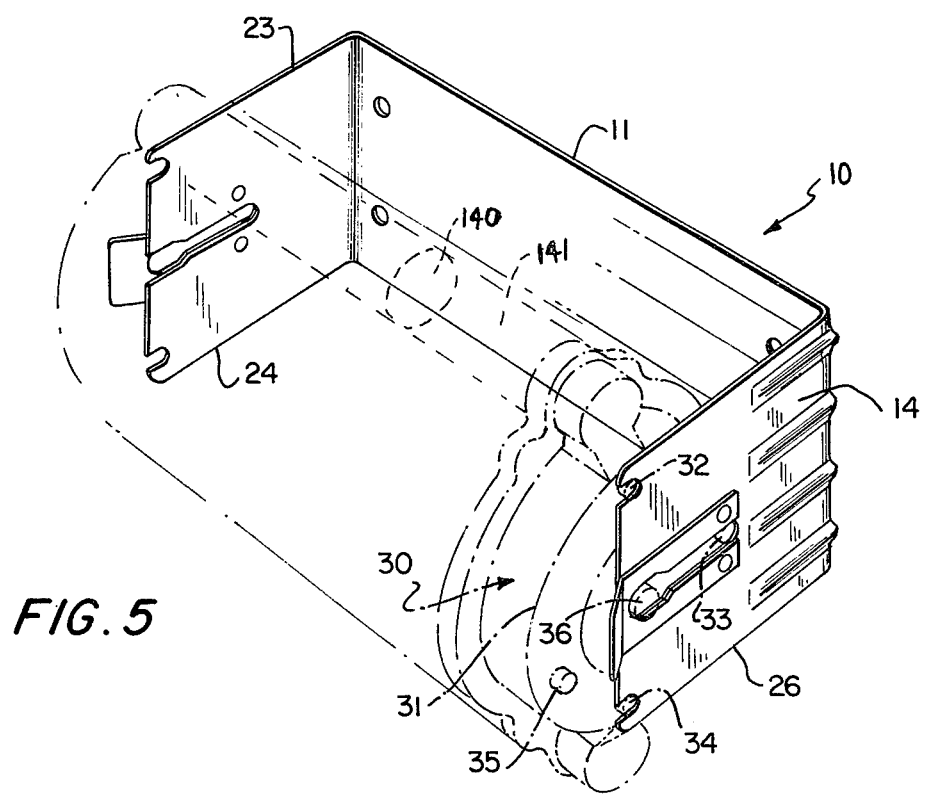
FIG. 5 represents a perspective view of the end of a pump mounted on the bracket of the present invention.

Referring now to FIG. 5 there is seen in a perspective view the end portion of a pump 30 as described and claimed in U.S. application Ser. No. 320,584 filed Nov. 12, 1981, entitled Self Contained Pumps And Reversing Mechanism Therefor, having the same inventive entity and common assignee, which is herein incorporated by reference. The pump is shown in detail mounted on the right flange of bracket 10 of the present invention. The end 31 of the pump 30 has pin-like protrusions 32, 33, 34 and 35 projecting therefrom at 90° intervals positioned about the periphery of the circumference of the end portion. When the Pump 30 is mounted on bracket 10 the peripheral protrusions engage the grooves in the front edges of the bracket flanges as illustrated. The axial pin 36 engages the respective clip face and is guided into the central groove 22 of the respective end flange. The peripheral pin 33 precedes the axial pin 36 into the central groove after first engaging the clip face 28b and is seated accordingly at the bottom of the respective groove 22. When the respective pins contact the face of the bent, wing-like extension of the corresponding clip, the latter is flexed outwardly from the respective flange member and once the pin enters the central groove the flange member snaps back to its original position. Once the axial engaging element or pin is seated in the groove the pump is mounted with the fluid outlet 140 of manifold tube 141 in the up position on top of the pump. Thus, with the pin locations on the periphery of the circular end of the pump displayed accordingly, it is always possible to mount the pump with the outlet tube at the top of the pump. It is possible to provide protrusions such as 32-35 at intervals smaller than 90°, for example, every 45° about the periphery of the end portion. In that event, it is necessary to provide additional grooves such as 17-18 or 20-21 for receiving the additional protrusions when the pump is mounted on the bracket.

As illustrated in FIG. 5, the bracket of the present invention allows the pump to be easily installed by snapping into and out of the bracket without the use of tools. The bracket configuration in combination with the design of the pump allows the pump to be mounted such that the dispenser outlet is always on the top of the pump regardless of where or how the bracket is mounted.

Figure 6:
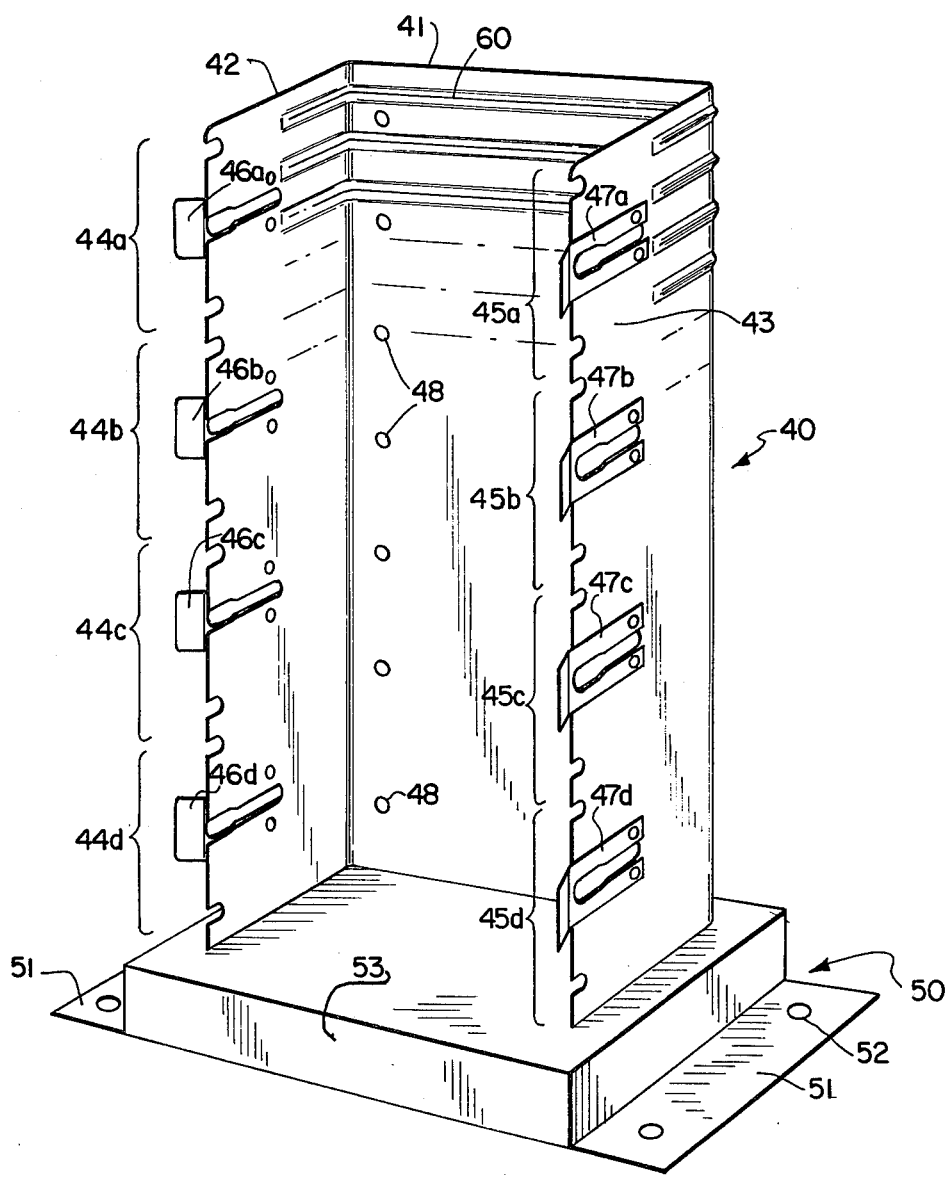
FIG. 6 represents a perspective view of an alternate configuration of the bracket of the present invention.

Referring now to FIG. 6 there is seen an alternate embodiment to the bracket of the present invention which provides for mounting a multitude of pumps, the number only limited by the height of the mounting bracket and the corresponding number of grooves provided on the front edges of the bracket. In FIG. 6 there is seen bracket 40 having a back portion 41 and lateral flanges 42 and 43. The front edges of the lateral flanges have successively formed therein sets of shallow and deep grooves 44 a, b, c, d and 45 a, b, c, d respectively. Each central groove has a corresponding clip 46 a, b, c, d and 47 a, b, c, d respectively provided for receiving and seating the respective pumps. The bracket 40 is provided with support base 50 having lateral extending flanges 51 with mounting holes 52 for fixing the bracket to a respective surface. Cross brace 53 is provided for preventing the respective legs or flanges of the bracket from spreading. The back portion 41 of the bracket 40 is also provided with holes 48 for alternately attaching the bracket to an appropriate surface. In such a use the support base 50 would be constructed so as not to protrude beyond the back plane of the bracket.

The bracket of the present invention may be constructed from any suitable material such as metal or durable plastics and ribs 60 are provided to lend structural stability to the respective members.

Although the bracket of the present invention has been discussed in terms of implementation with a pump having a circular end portion and circular engaging pin elements, the bracketed configuration can also be utilized with other pump configurations. For example, if the pin elements are rectangular, then so would be the corresponding grooves in the forward edges of the lateral flanges of the bracket. Likewise, the depth of the center most groove may be varied depending upon the structural configuration of the pump.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

I claim:
1. A mounting bracket for a device, said bracket comprising:
    a base;

a pair of substantially parallel, substantially rigid flanges extending from said base;

each said flange comprising at least a first edge;

a first groove in each of said respective first edges of said flanges for receiving at least one engaging element of a device;

retaining means adjacent said first groove on each of said flanges for retaining a corresponding one of said engaging elements within said first groove;

at least one additional groove in each of said first edges for receiving at least one additional retaining element of the device.

2. A bracket as in claim 1, wherein said grooves are spaced at uniform distances along said first edge of each flange.

3. A bracket as in claim 1, wherein said retaining means comprises a spring clip means affixed to each flange adjacent said first groove of each respective flange.

4. A bracket as in claim 1, wherein said first edge of each flange faces generally away from said base.

5. A bracket as in claim 1, wherein the configuration of said grooves corresponds to the shape of said engaging elements.

6. A bracket as in claim 1, comprising at least three of said grooves in each flange;

wherein said first groove is of substantially greater depth than the second and third grooves; and said second and third grooves are on opposite sides of said first groove and spaced at equal distances from said first groove along said first edge.

7. A bracket as in claim 6, wherein said retaining means comprises a spring clip means on each flange.

8. A bracket as in claim 7, wherein said spring clip means comprises a slot substantially coextensive with said first groove.

9. A bracket as in claim 6, wherein the device includes an axial engaging element and a plurality of peripheral engaging elements engageable with each flange;

said second and third grooves each being spaced from said first groove a distance equal to the radial distance between said axial engaging element and said peripheral engaging elements; and said first groove is of a depth substantially corresponding to said radial distance.

10. A bracket as in claim 9, wherein, said first groove is adapted to receive one of said peripheral engaging elements at the innermost portion thereof and said axial element adjacent the opposite portion thereof;

said second and third grooves are adapted to each receive one of said peripheral engaging elements; and said retaining means is adapted to engage said axial engaging element for retaining said axial engaging element in said first groove and for securing the device to said bracket.

11. A bracket as in claim 6, comprising a plurality of sets of said first, second and third grooves on each of said flanges for accommodating a plurality of devices.

12. A bracket as in claim 10, comprising a plurality of sets of said first, second and third grooves on each of said flanges for accommodating a plurality of devices.

13. A bracket as in claim 11, wherein said plurality of sets are arranged along said first edge of said bracket flanges.

14. A mounting bracket as in claim 1, in combination with a pump.

15. A mounting bracket as in claim 9, in combination with a pump which is generally circular and comprises an axial engaging element and a plurality of peripheral engaging elements on each end thereof and engageable with respective ones of said flanges.

16. A bracket as in claim 10, in combination with a pump which is generally circular and comprises an axial engaging element and a plurality of circumferentially spaced peripheral engaging elements on each end thereof and engageable with respective ones of said flanges, wherein a selected peripheral engaging element is received in each of said first grooves for orienting said pump in a selected position with respect to said bracket.

17. A bracket for supporting a device which has mounting pins, the bracket comprising:

a substantially rigid U-shaped member having a base portion and a pair of extending leg portions;

at least first, second and third pin-receiving grooves in the end of each of said leg portions remote from said base, said respective second and third grooves being positioned on opposite sides of said respective first grooves; and retaining means for retaining a pin within each of said first grooves.

18. A bracket as in claim 17, wherein said first grooves are substantially deeper than said second and third grooves.

19. A bracket as in claim 17, wherein said retaining means comprises a spring clip associated with each first groove for closing an open end thereof, said opening clip being movable for permitting insertion and removal of a pin in said first groove.

20. The combination of a device and a bracket for supporting said device in a plurality of positions, wherein said device has an axial dimension and two end portions;

each end portion comprising a first axial projection and a plurality of additional projections positioned around said first projection;

said bracket comprises a base and a pair of substantially rigid flanges spaced from each other at a distance corresponding to said axial dimension;

each said flange cooperating with an end portion of said device for supporting said device in a selected one of a plurality of positions, each flange comprising at least a first groove for receiving a corresponding first axial projection and a selected one of said additional projections for positioning said device in one of said positions;

each flange further comprising at least one additional groove for receiving another of said additional projections; and means associated with each flange for retaining said first axial projection and said selected additional projection in said first groove.

21. The combination of claim 20, comprising two of said additional grooves in each flange for receiving two of said additional projections.

22. The combination of claim 20, wherein said retaining means comprises a spring clip associated with each flange for engaging said first axial projections.

23. The combination of claim 20, wherein said device is a pump having an axial dimension and a generally circular cross section in a plane substantially perpendicular to said axial dimension, said pump being mountable in said bracket in a plurality of positions.

24. The combination of claim 23, wherein said first axial projections extend generally along the axis of said pump and said additional projections are spaced generally about the periphery thereof, and said pump is mountable in said bracket in a plurality of positions defined by said first axial projections and the angular positions of said additional projections about said axis.

25. The combination of claim 20, wherein said first axial projections define an axis of said device and said additional projections are radially spaced from said axis, and said device is mountable in said bracket in a plurality of positions defined by said first axial projections and the angular positions of said additional projections about said axis.

26. The combination of at least one pump and a bracket for mounting the pump, wherein
   each said pump is generally elongated and has generally circular end faces;
   each end face comprises a central axial projection and additional projections spaced about the periphery of the end face;
   said bracket comprises a base and a pair of flanges spaced from each other a distance corresponding to the length of said pump;
   each flange having at least one set of grooves, each set comprising a first groove for receiving a central axial projection and an additional projection, said first groove having a depth corresponding to the distance between said central axial projection and said additional projections;
   each set further comprising at least one additional groove for receiving one of said additional projections, said additional groove having a depth corresponding to the dimension of one of said additional projections and being spaced from said first groove by a distance corresponding to the distance between said central axial projection and said additional projections; and
   means associated with each of said first grooves for retaining the central axial projection and the additional projection therein.

27. The combination of claim 26, each of said flanges comprising plural sets of grooves, said combination comprising a corresponding number of pumps associated with said respective sets.

28. The combination of claim 26, each set comprising two of said additional grooves for receiving two of said additional projections.

29. The combination of claim 26, further comprising means for securing said bracket to another object.

30. The combination of claim 26, wherein said securing means is associated with said base.

* * * * *